United States Patent [19]

Haaf

[11] 4,167,507

[45] Sep. 11, 1979

[54] COMPOSITION OF A POLYPHENYLENE ETHER AND A HYDROGENATED BLOCK COPOLYMER

[75] Inventor: William R. Haaf, Voorbesville, N.Y.

[73] Assignee: General Electric Company, Pittsfield, Mass.

[21] Appl. No.: 935,099

[22] Filed: Aug. 21, 1978

Related U.S. Application Data

[63] Continuation of Ser. No. 826,196, Aug. 19, 1977, abandoned, which is a continuation of Ser. No. 387,588, Aug. 13, 1973, abandoned.

[51] Int. Cl.$^2$ .................. C08L 51/00; C08L 53/00
[52] U.S. Cl. .................................. 525/92; 260/42.18; 260/42.47; 260/897 R; 525/314
[58] Field of Search .................. 260/876 B, 42.18

[56] References Cited

U.S. PATENT DOCUMENTS

| 3,299,174 | 1/1967 | Kuhre et al. | 260/876 B |
|---|---|---|---|
| 3,333,024 | 7/1967 | Haetele et al. | 260/880 |
| 3,383,435 | 5/1968 | Cizek | 260/874 |
| 3,465,063 | 9/1969 | Hassell et al. | 260/876 B |
| 3,660,531 | 5/1972 | Lauchlan et al. | 260/876 B |
| 3,663,661 | 5/1972 | Katchman | 260/892 |

*Primary Examiner*—Richard B. Turer
*Attorney, Agent, or Firm*—Morgan, Finnegan, Pine, Foley & Lee

[57] ABSTRACT

There are provided compositions comprising a polyphenylene ether and a hydrogenated block copolymer such as copolymers of the A-B-A type wherein A designates a polymerized mono-alkenyl aromatic hydrocarbon block such as polystyrene and B designates a polymeric diene block which has had its unsaturation reduced by hydrogenation to less than 10% of the original unsaturation. These compositions have excellent impact resistance.

17 Claims, No Drawings

COMPOSITION OF A POLYPHENYLENE ETHER AND A HYDROGENATED BLOCK COPOLYMER

This is a continuation, now abandoned of application Ser. No. 826,196 filed Aug. 19, 1977; which in turn is a continuation of Ser. No. 387,588, filed Aug. 13, 1973, now abandoned.

This invention relates to novel resin compositions and more particularly, to polymer compositions which comprise a polyphenylene ether, a hydrogenated block copolymer, e.g. of the A-B-A wherein A designates a polymerized mono-alkenyl aromatic hydrocarbon block such as polystyrene and B designates a polymeric diene block which has had its unsaturation reduced by hydrogenation to less than 10% of the original unsaturation and, optionally a polystyrene homopolymer or random copolymer resin.

BACKGROUND OF THE INVENTION

The polyphenylene ethers are known and described in numerous publications including Hay, U.S. Pat. Nos. 3,306,874 and 3,306,875 and Stamatoff U.S. Pat. Nos. 3,257,357 and 3,257,358. The high-molecular weight polyphenylene ethers are high performance engineering thermoplastics possessing relatively high-melt viscosities and softening points—i.e., in excess of 275° C., and are useful for many commercial applications requiring high-temperature resistance including formation of films, fibers and molded articles.

Although they have the above-described desirable properties, it is also known that certain properties of the polyphenylene ether resins are undesirable for some commercial uses. For example, parts molded from the polyphenylene ethers are somewhat brittle due to poor impact strength. In addition, the relatively high-melt viscosities and softening points are considered a disadvantage for many uses. Films and fibers can be formed from polyphenylene ether resins on a commercial scale using solution techniques, but melt processing is commercially unattractive because of the high temperatures required to soften the resin and the problems associated therewith such as instability, discoloration and the requirement for specially designed process equipment to operate at elevated temperatures. Molded articles can be formed by melt processing techniques, but, again, the high temperatures required are undesirable.

It is known in the art that properties of the polyphenylene ether resins can be materially altered by blending them with other resins. For example, one method for improving the melt processability of the polyphenylene ethers is disclosed in a commonly-assigned patent, U.S. Pat. No. 3,379,792, incorporated herein by reference. According to this patent, flow properties of the polyphenylene ethers are improved by blending with from about 0.1 to 25 parts by weight of a polyamide. In another commonly-assigned patent, U.S. Pat. No. 3,361,851, a polyphenylene ether composition comprising a polyphenylene ether blended with a polyolefin is disclosed. The polyolefin is added to improve impact strength and resistance to aggressive solvents. In a third commonly-assigned patent, Cizek, U.S. Pat. No. 3,383,435, there are provided means for simultaneously improving the melt processability of the polyphenylene ether resins while simultaneously up-grading many properties of polystyrene homopolymer and random copolymer resins. The invention of the Cizek patent is based upon the discovery tha the polyphenylene ether resins and such polystyrene resins, including rubber modified polystyrene resins, are combinable in all proportions and result in compositions having many properties improved over those of either of the components.

One preferred embodiment of the Cizek patent is a composition comprising a high-impact, rubber reinforced polystyrene and a poly(2,6-dialkyl-1,4-phenylene) ether. This composition was preferred because it provides the aforementioned objectives of improving the melt-processability properties of the polyphenylene ether resin and provides the further advantage of improving impact resistance of parts molded from the blend. Furthermore, the Cizek composition of the polyphenylene ether and the high-impact polystyrene could be custom-formulated to provide predetermined properties ranging between those of the polystyrene and those of the polyphenylene ether by controlling the ratio of the two polymers. The reason for this is that the blend exhibits a single set of thermodynamic properties rather than two distinct sets of properties—i.e., one for each of the components of the blend as is typical with blends of prior art.

The styrene resins disclosed in the Cizek patent are either homopolymers or random copolymers. For example, the crystal polystyrenes of Examples 1 and 9 are homopolymers. Lustrex HT-88 of Example 7 is a commercial styrene grafted butadiene rubber modified high-impact polystyrene. In such products a portion of the styrene is homopolymerized into side chains onto a rubber backbone. The styrene containing copolymer resins disclosed in Cizek, Column 2, are random copolymers: styrene acrylonitrile, styrene-butadiene, styrene-acrylonitrile-$\alpha$-alkyl styrene copolymers, styrene-acrylonitrile-butadiene (ABS), copolymers of ethylvinyl benzene and divinyl benzene and the like. With the exception of styrene-acrylontirile-$\alpha$-methyl styrene, Example 17, none of the Cizek terminology can be construed to disclose a block copolymer of the A-B-A type. Because the monomers are grafted into terminal blocks, instead of side chains, A-B-A block copolymers are more linear and their properties differ markedly from the grafted rubber copolymers used in Cizek.

It is known from U.S. Pat. No. 3,660,531 to Lauchlan et al, that A-B-A block-type polymers have been employed in combination with polyphenylene ether resin compositions. The particular type of A-B-A polymer disclosed by Lauchlan et al is of the type that was used in Example 3. That copolymer is based on a B block that was essentially a butadiene moiety. These copolymers are distinctly different from the A-B-A block copolymers employed in the present invention which have what may be called an essentially olefinic rubber midblock and not a diene rubber midblock.

It has now been discovered that a hydrogenated block copolymer of the A-B-A type wherein A designates a polymerized mono-alkenyl aromatic hydrocarbon block such as polystyrene and B designates a polymeric diene block which has had its unsaturation reduced by hydrogenation to less than 10% of the original saturation, will impart unexpectedly high-impact strengths to polyphenylene ether resins and compositions of polyphenylene ether resins and polystyrene homopolymer and random copolymer resins. For example, a composition of 35 parts by weight of a polyphenylene ether resin, 50 parts by weight of a rubber-modified, high-impact polystyrene resin and 15 parts of a block copolymer of the A-B-A type wherein B is an olefin rubber midblock, had an Izod impact strength of 9.1 ft. lbs./in. notch. Also compositions according to this invention have high-heat deflection temperatures, high Gardner impact resistance, high thermal oxidative resistance, uv stability, high surface gloss and good resistance to solvents such as gasoline.

DESCRIPTION OF THE INVENTION

According to the present invention, there are provided normally solid thermoplastic compositions comprising:

(a) a polyphenylene ether resin and a styrene homopolymer or random copolymer resin and (b) a hydrogenated block copolymer.

The preferred compositions comprise:

(a) a polyphenylene ether resin and a styrene homopolymer or random copolymer resin and (b) a hydrogenated copolymer of the A-B-A type wherein prior to hydrogenation:

i. each A is a polymerized mono-alkenyl aromatic hydrocarbon block having an average molecular weight of about 4,000–115,000;

ii. B is a polymerized conjugated hydrocarbon block having an average molecular weight of about 20,000–450,000;

iii. the blocks A constituting 2–33 weight percent of the copolymer;

iv. 35–55% of the conjugated diene carbon atoms in block B being vinyl side chains;

v. and the unsaturation of block B having been reduced to less than 10% of the original unsaturation, said hydrogenated block copolymer being present in an amount of from 10 to about 90% by weight of the total components of the composition.

Preferred compositions will be those in which the polyphenylene ether comprises at least 20% by weight of the total resinous components in the composition.

It is to be understood, however, that the present composition can also include conventional amounts of conventional additives for processability, flame retardancy, stability and the like. These components are described in the literature and are described in the Modern Plastics Encyclopedia, Vol. 49 No. 10A 1972–1973 pp. 352–435, which are hereby incorporated by reference.

Preferred features of this invention are reinforced compositions containing reinforcing amounts of reinforcements, such as powders, whiskers, fibers or platelets of metals, e.g., aluminum, bronze, iron or nickel, and non-metals, e.g., carbon filaments, acicular $CaSiO_3$, asbestos, $TiO_2$, titanate whiskers, glass flakes and fibers and the like. Such reinforcements will be present in an amount of e.g., 2 to 90% by weight, preferably 10 to 60% by weight. Especially preferred as a reinforcement is fibrous glass.

In preferred compositions the polyphenylene ether resins in component (a) will be those having repeating structural units of the formula

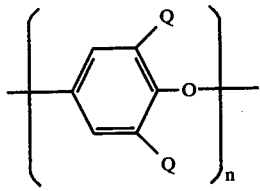

wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon, radicals, halohydrocarbon radicals having at least two carbon atoms between the halogen atom and the phenyl nucleus, hydrocarbonoxy radicals, and halohydrocarbonoxy radicals having at least two carbon atoms between the halogen atom and phenyl nucleus. The preparation of polyphenylene ether resins corresponding to the above formula is described in the abovementioned patents of Hay and Stamatoff. Especially preferred polyphenylene ether resins for purposes of the present invention are those having alkyl substitution in the two positions ortho to the oxygen ether atom—i.e., where each Q is alkyl, most preferably, having from 1 to 4 carbon atoms. The most preferred polyphenylene ether resin for purposes of the present invention is poly(2,6-dimethyl-1,4-phenylene) ether (each Q is methyl).

With respect to component (b), the hydrogenated block copolymers of the A-B-A type are made by means known in the art and they are commercially available.

These materials are described in U.S. Pat. No. 3,431,323 to Jones, which is hereby incorporated by reference.

Prior to hydrogenation, the end blocks of these copolymers comprise homopolymers or copolymers preferably prepared from alkenyl aromatic hydrocarbons and particularly vinyl aromatic hydrocarbons wherein the aromatic moiety may be either monocyclic or polycyclic. Typical monomers include styrene, alpha methyl styrene, vinyl xylene, ethyl vinyl xylene, vinyl naphthalene and the like or mixtures thereof. The end blocks may be the same or different. The center block may be derived from, for example, polyisoprene or polybutadiene.

The ratio of the copolymers and the average molecular weights can vary broadly although the molecular weight of center block should be greater than that of the combined terminal blocks. It is preferred to form terminal blocks A having average molecular weights of 4,000–115,000 and center block B e.g., a polybutadiene block with an average molecular weight of 20,000–450,000. Still more preferably, the terminal blocks have average molecular weights of 8,000–60,000 while the polybutadiene polymer blocks has an average molecular weight between 50,000 and 300,000. The terminal blocks will preferably comprise 2–33% by weight, or more preferably, 5–30% by weight of the total block polymer. The preferred copolymers will be those formed from a copolymer having a polybutadiene center block wherein 35–55%, or more preferably, 40–50% of the butadiene carbon atoms are vinyl side chains.

The hydrogenated copolymers will have the average unsaturation reduced to less than 20% of the original value. It is preferred to have the unsaturation of the center block B reduced to 10%, or more preferably, 5% of its original value.

The block copolymers are formed by techniques well known to those skilled in the art. Hydrogenation may be conducted utilizing a variety of hydrogenation catalysts such as nickel or kieselguhr, Raney nickel, copper chromate, molybdenum sulfide and finely divided platinum or other noble metals on a low surface area carrier.

Hydrogenation may be conducted at any desired temperature or pressure, from atmospheric to 300 p.s.i.g. the usual range being between 100 and 1000 p.s.i.g. at temperatures from 75° F. to 600° F. for times between 0.1 and 24 hours, preferably from 0.2–8 hours.

Hydrogenated block copolymers such as Kraton G - GXT-0650, Kraton G- GXT-0772 and Kraton G- GXT-0782 from Shell Chemical Company, Polymers Division have been found useable according to the present invention when the above-described block copolymers have been employed.

Also, component (b) according to the present invention may be a hydrogenated block copolymer of the type C-A'-B'-A'-C wherein A' is a polymerized monoalkenyl aromatic hydrocarbon block having an average molecular weight between about 7,500 and 100,000, B' is an elastomeric conjugated diene polymer block having an average molecular weight between about 25,000 and 200,000, said block B' being of the group consisting of polymerized butadiene blocks having 35–55%, 1,2 content and polyisoprene blocks; and C is a polymerized butadiene block having an average molecular weight between about 1,000 and 15,000, said blocks C having less than 25% 1,2 content and comprising 0.5–40% by weight of the block copolymer; said block copolymer having had at least 80% of the unsaturation of blocks B and C reduced by hydrogenation.

These hydrogenated block copolymers are described in U.S. Pat. No. 3,670,054 which is hereby incorporated by reference. Compositions which include this material possess good solvent resistance.

As noted above, the hydrogenated block copolymer resin may be added to a polyphenylene ether resin or to a composition of a polyphenylene ether resin with an additional resin, preferably a polystyrene homopolymer or random copolymer resin and most preferably, a high-impact polystyrene resin. As disclosed in the above-mentioned Cizek patent, the styrene resin most readily combinable with the polyphenylene ether resin is one having at least 25% by weight polymer units derived from vinyl aromatic monomer having the formula

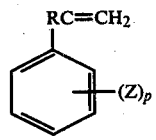

wherein R is hydrogen alkyl of 1 to 4 carbon atoms or halogen; Z is a member selected from the class consisting of vinyl, hydrogen, or alkyl of from 1 to 4 carbon atoms; and p is from 1 to 5. Such compositions will comprise from 1 to 99% by weight of the polyphenylene ether component and from 99 to 1% by weight of the polystyrene resin. The preferred styrene resin, for purposes of this invention, is one comprising either a styrene homopolymer or a rubber-modified polystyrene, e.g., blended or grafted with from about 3 to 30, preferably from 4 to 12% by weight of a polybutadiene or a rubbery random copolymer, e.g., of about 70% BD and 30% styrene.

The amount of hydrogenated block copolymer resin added to the polyphenylene ether resin or composition thereof with polystyrene may vary within rather broad limits, but preferably ranges from about 10 to 90% by weight of the total components of the composition.

In a preferred family of compositions the polyphenylene ether comprises from about 10 to about 90% by weight, the hydrogenated block copolymer from about 10 to about 90% by weight and the styrene homopolymer or random copolymer resin component comprises from 0 to the remainder by weight of the total weight of the resinous components in said composition. Especially preferred are compositions in which the polyphenylene ether is poly(2,6-dimethyl-1,4-phenylene) ether and comprises from about 10 to about 60% by weight, component (b) is a hydrogenated block copolymer of the A-B-A type and comprises from about 5 to about 50% by weight and the styrene homopolymer or random copolymer resin component is a rubber-modified polystyrene and comprises from 0 up to the remainder by weight of the total weight of the resinous components in the composition.

As noted hereinabove, other additives may be present in the compositions such as plasticizers, pigments, flame retardants and stabilizers in amounts varying between about 1 and 30 percent by weight of the total composition. The above-stated range for the hydrogenated block copolymer resin, the polyphenylene ether resin and, if present, the polystyrene resin, is based solely upon such resinous components in the polymer blend and excludes other additives.

The method of forming the polymer composition is not critical, prior art blending techniques being suitable. The preferred method comprises blending the polymers and additives, such as reinforcements in powder, granular and filamentous form—as the case may be—extruding the blend and chopping into pellets suitable for molding to shape by means conventionally used to mold normally solid thermoplastic compositions.

DESCRIPTION OF THE PREFERRED EMBODIMENTS

The advantages obtained by providing compositions of a hydrogenated block copolymers, e.g., of the A-B-A type with a polyphenylene ether resin, alone or in combination with another resin, are illustrated in the following examples which are set forth as further descriptions of the invention, but are not to be construed as limiting the invention thereto.

EXAMPLE 1

The following formulation is mechanically blended, then co-extruded in a ¾" Wayne-type extruder and molded into test pieces in a 3 oz. Newbury injection molding machine.

| Ingredients | Parts by weight |
| --- | --- |
| poly(2,6-dimethyl-1,4-phenylene) ether* | 50 |
| hydrogenated block copolymer of styrene-butadiene-styrene** | 50 |

*General Electric Company, PPO in powder form, intrinsic viscosity 0.40–0.65 dl/g.
**Kraton GXT-0650 Shell Chemical Company.

EXAMPLE 2

The following formulation was prepared according to the procedure of Example 1.

| Ingredients | Parts by weight |
| --- | --- |
| poly(2,6-dimethyl-1,4-phenylene) ether (as in Example 1) | 35 |
| crystal homopolystyrene | 30 |
| hydrogenated block copolymer of styrene - butadiens-styrene (as in Example I) | 35 |
| Polyethylene (M 710) | 1.5 |

-continued

| Ingredients | Parts by weight |
|---|---|
| Tridecyclphosphite | 0.5 |
| Zinc sulfide | 0.15 |
| Zinc oxide | 0.15 |
| Triphenylphosphate | 7.0 |

PROPERTIES

| | |
|---|---|
| Izod impact (ft. lbs./in notch) | 10.1 |
| Heat distortion temperature (264 psi) | 212° F. |
| Gardner impact (in. lbs.) | 123 |

EXAMPLE 3

The formulation of Example 2 was modified by reducing the amount of hydrogenated block copolymer of styrene-butadiene-styrene to 15 parts by weight and substituting 50 parts by weight of a rubber-modified, high-impact styrene (FG 834, Foster Grant) for the 30 parts by weight of the crystal homopolystyrene.

PROPERTIES

| | |
|---|---|
| Izod impact (ft. lbs./in notch) | 9.1 |
| Heat Distortion Temperature (264 psi) | 206° F. |
| Gardner Impact (in. lbs.) | 172 |

A composition was prepared according to Example 2 which did not have any crystal homopolystyrene or hydrogenated block copolymer but instead had 65 parts by weight of rubber-modified, high-impact polystyrene (Foster Grant, FG 834).

PROPERTIES

| | |
|---|---|
| Izod Impact (ft. lbs./in. notch) | 4.8 |
| Heat Distortion Temperature (264 psi) | 202° F. |
| Gardner Impact | 108 |

EXAMPLE 3

The formulation of Example 1 is modified by substituting for the particular hydrogenated block copolymer, a copolymer prepared according to the disclosure of U.S. Pat. No. 3,431,323, column 5, lines 71-75 and column 6, lines 1-10 using a molar ratio of polar compound to lithium of about 25.

EXAMPLE 4

A hydrogenated block copolymer is prepared according to the Example set forth in U.S. Pat No. 3,670,054 and 50 parts by weight of this copolymer is blended with 50 parts by weight of the poly(2,6-dimethyl-1,4-phenylene) ether employed hereinabove in EXAMPLE 1. This composition has good resistance to solvents such as gasoline.

EXAMPLE 5

The composition of Example 2 is modified by the addition of 10% by weight of fibrous glass to produce an improved high-impact strength composition.

EXAMPLE A

Test bars containing equivalent amounts of a polyphenylene ether resin were prepared by extrusion blending according to the method of Example 1 with the following composition:

| | Parts by weight | |
|---|---|---|
| Ingredient | A | B |
| poly(2,6-dimethyl-1,4-phenylene) ether (as in Example 1) | 35 | 35 |
| high impact polystyrene (FG 834) | 65 | — |
| crystal polystyrene (Dylene 8) | — | 40 |
| hydrogenated block copolymer of styrene-butadiene-styrene (Kraten GXT-0650) | — | 20 |
| polyethylene (M 710) | 1.5 | 1.5 |
| triphenyl phosphate | 7.0 | 9.0 |
| tridecyl phosphite | 0.5 | 0.5 |
| zinc sulfide | 0.15 | 0.15 |
| zinc oxide | 0.15 | 0.15 |

The compositions were subjected to thermal aging at 90° C. and 100° C. in air-circulating ovens. The samples were tested at the noted intervals according ASTM D 1822 for s-type tensile impact strength:

| | A | B |
|---|---|---|
| At 90° C. | | |
| 0 | 50 | 48 (s type impact ft./lbs./in²) |
| 36 weeks | 25.9 | 35.9 |
| At 100° C. | | |
| 0 | 50 | 48.0 |
| 24 | 29.0 | — |
| 36 | 15.1 | 31.0 |

The data shows that the composition containing the hydrogenated block copolymer has superior thermal oxidative stability.

Obviously, other modifications and variations of the present invention are possible in the light of the above teachings. It is, therefore, to be understood that changes may be made in the particular embodiments of the invention described which are within the full intended scope of the invention as defined in the appended claims.

I claim:
1. A normally solid thermoplastic composition comprising:
   (a) from 10 to about 90% by weight of a polyphenylene ether resin or a composition comprising a polyphenylene ether resin and a styrene homopolymer or random copolymer resin, and
   (b) a hydrogenated block copolymer of the A-B-A type where A is a polymerized monoalkenyl aromatic hydrocarbon block and B is a polymeric diene block which has had its unsaturation reduced to less than 10% of the original unsaturation.

2. A normally solid thermoplastic composition comprising
   (a) from about 10 to about 90% by weight of a polyphenylene ether resin or a composition comprising a polyphenylene ether resin and a styrene homopolymer or random copolymer resin and
   (b) a hydrogenated block copolymer of the A-B-A type wherein prior to hydrogenation:
   i. each A is a polymerized mono-alkenyl aromatic hydrocarbon block having an average molecular weight of about 4,000-115,000;
   ii. B is a polymerized conjugated diene hydrocarbon block having an average molecular weight of about 20,000-450,000;

iii. the blocks A constituting 2-23 weight percent of the copolymer;
iv. 35-55% of the conjugated diene carbon atoms in block B being vinyl side chains;
v. and the unsaturation of block B having been reduced to less than 10% of the original unsaturation, said hydrogenated block copolymer being present in an amount of from 10 to about 90% by weight of the total components of the composition.

3. A composition as defined in claim 1 wherein component (a) is a polyphenylene ether of the formula

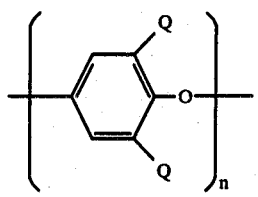

wherein the oxygen ether atom of one unit is connected to the benzene nucleus of the next adjoining unit; n is an integer of at least 50; and each Q is a monovalent substituent selected from hydrogen, halogen, hydrocarbon radicals, halohydrocarbon radicals having at least two carbon atoms between the halogen atom and the phenyl nucleus, hydrocarbonoxy radicals, and halohydrocarbonoxy radicals having at least two carbon atoms between the halogen atom and the phenyl nucleus.

4. A composition as defined in claim 3 wherein each Q is alkyl having from 1 to 4 carbon atoms.

5. A composition as defined in claim 3 wherein each Q is methyl.

6. A composition as defined in claim 2 wherein said polyphenylene ether comprises at least 20% by weight of the total resinous components in said composition.

7. A composition as defined in claim 2 wherein in component (b), prior to hydrogenation the polymeric blocks A are polymer blocks of a vinyl aromatic hydrocarbon.

8. A composition according to claim 1 wherein said hydrogenated block copolymer is of the C-A'-B'-A'-C type wherein A' is a polymerized mono-alkenyl aromatic hydrocarbon block having an average molecular weight between about 7,500 and 100,000; B' is an elastomeric conjugated diene polymer block having an average molecular weight between about 25,000 and 200,000, said block B' being of the group consisting of polymerized butadiene blocks having 35-55% 1,2 content and polyisoprene blocks and C is a polymerized butadiene block having an average molecular weight of between about 1,000 and 15,000, said blocks C having less than 25% 1,2 content and comprising 0.5-40% by weight of the block copolymer; said block copolymer having had at least 80% of the unsaturation of blocks B and C reduced by hydrogenation.

9. A composition as defined in claim 2 wherein, in component (b), the blocks A comprise 5-30% by weight of the copolymer, the unsaturation of block B is reduced to less than 5% of its original value and the average unsaturation of the hydrogenated block copolymer is reduced to less than 20% of the original value.

10. A composition as defined in claim 2 wherein, in component (b):
i. each A is a polymerized styrene block having an average molecular weight of about 8,000-60,000;
ii. B is a polymerized butadiene block having an average molecular weight of about 50,000-300,000, 40-50% of the butadiene carbon atoms in the block being vinyl sidechains;
iii. the blocks A comprising 5-30% by weight of the copolymer; the unsaturation of block B having been reduced by hydrogenation to less than 10% of its original value.

11. A composition as defined in claim 1 wherein component (a) comprises:
i. from 1 to 99% by weight of a polyphenylene ether of the formula

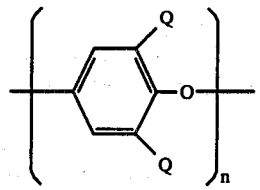

where Q is alkyl of from 1 to 4 carbon atoms and n is an integer of at least 50 and
ii. from 99 to 1% by weight of a styrene homopolymer or random copolymer resin having at least 25% of the polymer units derived from a vinyl aromatic compound of the formula

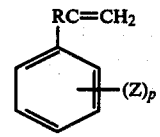

wherein R is hydrogen, alkyl of from 1 to 4 carbon atoms or halogen, Z is hydrogen, alkyl of from 1 to 4 carbon atoms or vinyl and p is an integer of from 1 to 5.

12. A composition as defined in claim 11 wherein the styrene resin is a styrene homopolymer resin or a rubber-modified styrene resin, said rubber comprising a diene rubber or a rubbery copolymer of butadiene and styrene in an amount of from about 4 to about 12% by weight of said resin.

13. A composition as defined in claim 11 wherein the polyphenylene ether is poly(2,6-dimethyl-1,4-phenylene) ether.

14. A composition as defined in claim 1 wherein the polyphenylene ether comprises from about 20 to about 60% by weight, the hydrogenated block copolymer comprises from about 15 to about 50% by weight, and the styrene homopolymer or random copolymer resin component comprises from 0 to the remainder by weight of the total weight of the resinous components in said composition.

15. A reinforced composition as defined in claim 1 including a reinforcing amount of fibrous glass.

16. A normally solid thermoplastic composition comprising:
(a) from 10 to about 90% by weight of a polyphenylene ether resin of the formula:

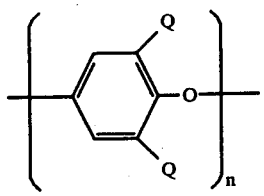

wherein the oxygen ether atom of one unit is connected to the benzene nucleus of the next adjoining unit; n is an integer of at least 50; and each Q is a monovalent substituent selected from hydrogen, halogen, hydrocarbon radicals, halohydrocarbon radicals having at least two carbon atoms between the halogen atom and the phenyl nucleus; or a composition of a polyphenylene ether resin as defined above and a rubber-modified styrene resin and;

(b) from 90 to about 10% by weight of a hydrogenated block copolymer of the A-B-A type wherein prior to hydrogenation:

i. each A is a polymerized monoalkenyl aromatic hydrocarbon block having an average molecular weight of about 4,000–115,000;

ii. B is a polymerized conjugated diene hydrocarbon block having an average molecular weight of about 20,000–450,000;

iii. the blocks A constituting 2–33 weight percent of the copolymer;

iv. 35–55% of the conjugated diene carbon atoms in block B being vinyl side chains;

v. and the unsaturation of block B having been reduced to less than 10% of the original unsaturation.

17. A normally solid thermoplastic composition comprising:

(a) from 10 to about 90% by weight of a polyphenylene ether resin or a composition comprising a polyphenylene ether resin and a styrene resin having at least 25% by weight of its polymer units derived from a vinyl aromatic monomer having the formula:

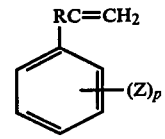

wherein R is hydrogen, alkyl of 1 to 4 carbon atoms or halogen; Z is a member selected from the class consisting of vinyl, hydrogen or alkyl of from 1 to 4 carbon atoms; and p is an integer of from 1–5; and (b) from 90–10 parts by weight of a hydrogenated block copolymer of the C-A'-B'-A'-C type wherein A' is a polymerized monoalkenyl aromatic hydrocarbon block having an average molecular weight between about 7,500 and 100,000; B' is an elastomeric conjugated diene polymer block having an average molecular weight between about 25,000 and 200,000, said block B' being of the group consisting of polymerized butadiene blocks having 35–55% 1,2 content and polyisoprene blocks and C is a polymerized butadiene block having an average molecular weight of between about 1,000 and 15,000, said blocks C having less than 25% 1,2 content and comprising 0.5–40% by weight of the block copolymer; said block copolymer having had at least 80% of the unsaturation of blocks B' and C reduced by hydrogenation.

* * * * *

UNITED STATES PATENT AND TRADEMARK OFFICE
CERTIFICATE OF CORRECTION

PATENT NO. : 4,167,507
DATED : September 11, 1979
INVENTOR(S) : William Robert Haaf It is certified that error appears in the above-identified patent and that said Letters Patent are hereby corrected as shown below:

In Col. 9, line 56, "B" should correctly read -- B' --.

Signed and Sealed this

Eighteenth Day of March 1980

[SEAL]

Attest:

SIDNEY A. DIAMOND

Attesting Officer

Commissioner of Patents and Trademarks